(12) United States Patent
Kumar et al.

(10) Patent No.: US 11,287,329 B2
(45) Date of Patent: Mar. 29, 2022

(54) FRACTIONAL MIRROR RATIO TECHNIQUE FOR DIGITAL REMOTE TEMPERATURE SENSORS, AND RELATED SYSTEMS, METHODS, AND DEVICES

(71) Applicant: Microchip Technology Incorporated, Chandler, AZ (US)

(72) Inventors: Ajay Kumar, Phoenix, AZ (US); Hyunsoo Yeom, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 498 days.

(21) Appl. No.: 16/228,045

(22) Filed: Dec. 20, 2018

(65) Prior Publication Data

US 2020/0096395 A1 Mar. 26, 2020

Related U.S. Application Data

(60) Provisional application No. 62/736,937, filed on Sep. 26, 2018.

(51) Int. Cl.
*G01K 7/00* (2006.01)
*G01K 7/01* (2006.01)

(52) U.S. Cl.
CPC .................................... *G01K 7/01* (2013.01)

(58) Field of Classification Search
USPC ................................................ 374/178, 170
See application file for complete search history.

(56) References Cited

U.S. PATENT DOCUMENTS

| | | | | |
|---|---|---|---|---|
| 6,008,685 A * | 12/1999 | Kunst | ..................... | G01K 7/01 327/512 |
| 6,097,239 A * | 8/2000 | Miranda, Jr. | ............ | G01K 7/01 327/512 |
| 6,637,934 B1 * | 10/2003 | Henderson | ............. | G01K 1/028 326/82 |
| 6,808,307 B1 * | 10/2004 | Aslan | ..................... | G01K 1/028 374/178 |
| 7,010,440 B1 * | 3/2006 | Lillis | ........................ | G01K 7/01 327/512 |
| 2003/0086476 A1 * | 5/2003 | Mizuta | ................... | G01K 15/00 374/178 |
| 2006/0029123 A1 * | 2/2006 | Johnson | ................. | G01K 15/00 374/178 |
| 2006/0093016 A1 * | 5/2006 | McLeod | .................. | G01K 7/01 374/178 |
| 2006/0193370 A1 * | 8/2006 | St. Pierre | ................. | G01K 7/01 374/178 |

(Continued)

OTHER PUBLICATIONS

Denton, Emmy, "Optimizing Remote Diode Temperature Sensor Design Optimizing Remote Diode Temperature Sensor Design Optimizing Remote Diode Temperature Sensor Design", Jan. 1, 2017, pp. 1-18, XP055651019, www.ti.com/lit/an/sboa173/sboa173.pdf.

(Continued)

*Primary Examiner* — Mirellys Jagan
(74) *Attorney, Agent, or Firm* — TraskBritt

(57) ABSTRACT

Systems, methods and devices are described related to remote temperature sensing. In one embodiment, fractional currents are used to bias a remote temperature diode. Such fractional currents may be selected to simplify at least some temperature calculations performed using digital logic.

20 Claims, 4 Drawing Sheets

(56) References Cited

U.S. PATENT DOCUMENTS

2007/0009006 A1* 1/2007 Yang .................... G01K 7/01
374/1

OTHER PUBLICATIONS

International Search Report for International Application No. PCT/US2019/051749, dated Dec. 19, 2019, 3 pages.
International Written Opinion for International Application No. PCT/US2019/051749, dated Dec. 19, 2019, 10 pages.

* cited by examiner

```
                                    ┌─ 200
                                    ▼
```

Receive a number of voltage measurements, each voltage measurement of the number of voltage measurements associated with an excitation current of a number of excitation currents, wherein at least some of the voltage measurements are fractional voltages
202

Determine at least two voltage changes responsive to the voltage measurements

204

Determine a temperature responsive to the at least two voltage changes and the excitation currents, wherein at least some of the excitation currents are fractional currents
206

*FIGURE 2*

FRACTIONAL MIRROR RATIO TECHNIQUE FOR DIGITAL REMOTE TEMPERATURE SENSORS, AND RELATED SYSTEMS, METHODS, AND DEVICES

CROSS-REFERENCE TO RELATED APPLICATION

This application claims the benefit under 35 U.S.C. § 119(e) of U.S. Provisional Patent Application Ser. No. 62/736,937, filed Sep. 26, 2018, the disclosure of which is hereby incorporated herein in its entirety by this reference.

TECHNICAL FIELD

Embodiments of this disclosure relate, generally, to temperature sensing and, more specifically, some embodiments relate to digital remote temperature sensing.

BACKGROUND

Remote temperature sensors are commonly used in telecommunication equipment (switches and routers), servers, personal computers, tablet computers, mobile phones, automotive infotainment systems, batteries, and high-end displays. Remote temperature sensors are often integrated with a monitored device (e.g., a computer processing unit).

In a typical remote temperature sensor, the actual sensor is a bipolar-junction-transistor (BJT) or diode that is affected in some known and somewhat predictable way by the temperature of the monitored device, or monitored environment.

In the case of a PNP BJT remote temperature sensor, a collector current (including changes in collector current) is primarily due to charge that is injected (i.e., an electrical current) at an emitter into the base and diffuses toward the collector, and by design, the base-emitter junction has a predictable transfer function that is dependent on temperature. Accordingly, in theory a temperature of the sensor can be calculated by forward-biasing the base-emitter junction and measuring the base-emitter voltage ($V_{BE}$).

BRIEF DESCRIPTION OF DRAWINGS

Advantages of the embodiments of the disclosure will be apparent to those of ordinary skill in the art from the following detailed description and the accompanying drawings and appendices:

FIG. 2 shows a temperature calculation process that uses predetermined fractional currents, in accordance with one or more embodiments of the disclosure.

DETAILED DESCRIPTION

Figure 1:
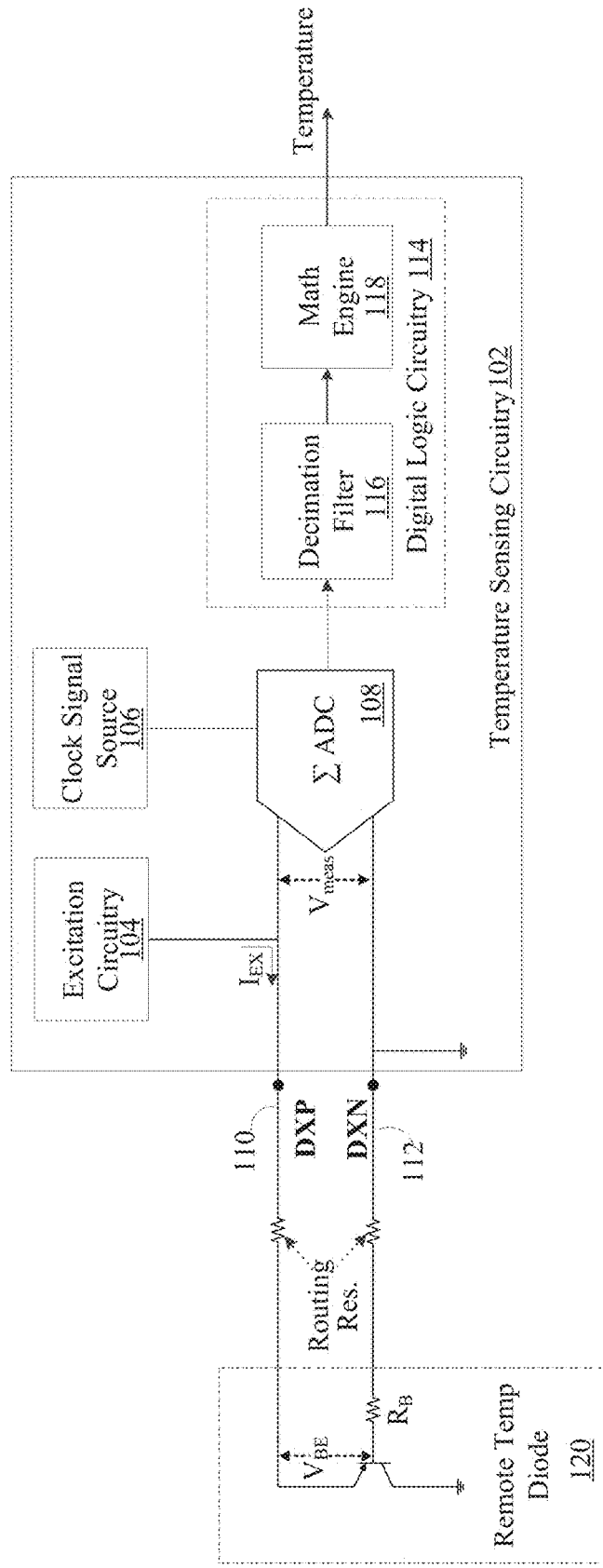
FIG. 1 shows a block diagram of a remote temperature sensor system that is configured to implement forward biasing techniques in accordance with one or more embodiments of this disclosure.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

The following description may include examples to help enable one of ordinary skill in the art to practice the disclosed embodiments. The use of terms such as "exemplary," "by example," "for example," and "e.g.," means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Any characterization in this disclosure of something as 'typical,' 'conventional,' or 'known' does not necessarily mean that it is disclosed in the prior art or that the discussed aspects are appreciated in the prior art. Nor does it necessarily mean that, in the relevant field, it is widely known, well-understood, or routinely used.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

As used herein "standard current" means a base current to be applied to a temperature sensor and used as a reference such that other currents that are applied to the temperature sensor have an integer or fractional relationship with such base current.

One technique for determining temperature measurements known to the inventors of this disclosure is to forward bias a remote temperature diode using a number of excitation currents (also referred to herein as "biasing currents") that have an integer relationship with a standard current (e.g., a multiple thereof). For example, excitation currents may be integer multiples (e.g., 1×, 2×, 10×, and 20×) of a standard current. Notably, an excitation current that is 1× a standard current is equal to a standard current. Each excitation current is different, but proportional to each other. In this disclosure, a ratio of proportionality to a standard current is called a "mirror ratio" (MR)—e.g., the integers 1, 2, 10, and 20, shown in the previous example. For clarity, while excitation currents may be related to a standard current, that is not meant to require or imply an actual standard current is used during operation, as it may denote a relationship.

Each voltage measurement $V_{BE}$ (also called $V_{MEAS}$) is associated with one of these different excitation currents. Changes to VBE (i.e., $\Delta V_{BE}$) are calculated, and the calculated changes are used to determine a temperature using, e.g., Equation 1, below:

$$T = \frac{V_{input} \cdot q}{nk\left(2\ln\frac{I_{C10}}{I_{C1}} - \ln\frac{I_{C20}}{I_{C2}}\right)} \qquad \text{Equation 1}$$

Where $V_{INPUT} = \Delta V_{BE}$ measurements.

However, solving for a natural log (i.e., 1n) using digital logic is challenging, at least in part, because simplification (i.e., expanding each logarithm into a system of equations) is complicated to implement and solve using digital logic. Moreover, digital circuitry configured to solve for a natural log typically includes a large number of registers that take up physical space in silicon and may require floating point number calculations and registers.

One technique known to the inventors of this disclosure is to use a linearized formula to determine a temperature. For example, measurements of $V_{BE}$ are scaled for a sub-ranged input (e.g., −40 to 125 Celsius) so that they cross $V_{REF}$ of the ADC, and then a temperature (T) is solved for using Equation 2, below:

$$T = \frac{\alpha \Delta V_{BE}}{V_{REF}} \cdot A - \text{offset} \qquad \text{Equation 2}$$

Where α is a scaling factor and A is the full range of codes of an ADC (i.e., resolution).

However, for this technique, only a sub-range of possible voltages may be measured (otherwise the scaling factor might saturate an ADC), and there is a significant trade-off in terms of ADC resolution in order to use a linearized formula. Moreover, the inventors of this disclosure appreciate that operations for digital calibration steps (e.g., to account for errors) are difficult to implement using digital logic when measurements are scaled because, at least in part, absolute value measurements are required for calibration, but not possible (or at least practical) with digital logic.

One or more embodiments of this disclosure relate, generally, to techniques for forward biasing remote temperature sensors with excitation currents having fractional mirror ratios. Two or more pairs of excitation currents are generated where at least some of the excitation currents are related to a standard current by one or more fractional mirror ratios. In one or more embodiments, the fractional mirror ratios may be pre-determined, and values may be selected that have a known integer natural logarithm.

In other words, as used herein a "fractional mirror ratio" means a ratio between an integer number and a fractional number that is the result of the mathematical constant e raised to an integer power (i.e., a "natural logarithm fraction"). As non-limiting examples, two fractional mirror ratios are $e^2 \approx 7.389$ and $e^3 \approx 20.085$. Thus, when the natural logarithm mathematical function is performed on a natural logarithm fraction, the result is an integer number (which includes, without limitation, integer results calculated by an arithmetic logic unit using a defined precision). For example $\ln(7.389) \approx 2$ and $\ln(20.085) \approx 3$. Thus, a fractional mirror ratio may be a ratio of 1 to 7.389 or 2 to 14.778.

Moreover, as used herein the term "fractional currents" means two currents that have a fractional mirror ratio between them. In a case where a pair of currents that are, together, fractional currents, one or both currents may have a fractional current value. For example, a first current might be 1 μA and a second current may be 7.389 μA and they have a fractional mirror ratio relationship of 7.389.

For example, a contemplated operation may be configured with four currents expressed in two pairs, where $I_1$ and $I_2$ are a pair, $I_3$ and $I_4$ are a pair, and the standard current is selected as 1 μA. Each pair is defined to have a fractional mirror ratio. Thus, a fractional mirror ratio between $I_1$ and $I_2$ may have an MR=7.389 and a fractional mirror ratio between $I_3$ and $I_4$ may have an MR=14.778. In addition, an integer ratio may be defined between the pairs. For example, if the integer ratio is defined as 2, and $I_1$ is the standard current, then with an integer ratio of 2, $I_2=2*I_1$ and $I_4=2*I_3$. This simplifies the computational complexity of calculating a temperature (e.g., according to Equation 1 or another equation that uses natural logarithms) because the natural logarithms are known—at least with respect to disadvantages associated with solving for natural log described above.

In other words, with respect to a standard current (SC) with an integer ratio of 2 between the pairs and a fractional mirror ratio of 7.389 between the elements within each pair, $$I_1=SC=1\mu A, I_2=7.389*SC=7.389\mu A \rightarrow \ln(7.389)=2$$

$$I_3=2*SC=2\mu A, I_4=2*7.389*SC=14.778\mu A \rightarrow \ln(14.778)/2=2$$

Using these currents for an example calculation, Equation 1 can be modified to be expressed as:

$$T = \frac{V_{input} \cdot q}{nk\left(2\ln\frac{I_{C(7.38)}}{I_{C1}} - \ln\frac{I_{C(14.78)}}{I_{C2}}\right)} = \frac{V_{input} \cdot q}{nk(2*2-2)} \quad \text{Equation 3}$$

Thus, by selecting currents to apply to the temperature sensor that have the proper combination of fractional mirror ratios and integer ratios, the natural logarithm functions are removed from equation 1 and a simple equation can be used to determine the temperature based on voltage measurements related to the currents.

FIG. 1 shows simplified block diagram of an example embodiment of a remote temperature sensor system 100 configured to implement forward biasing techniques in accordance with one or more embodiments of this disclosure. FIG. 1 depicts a temperature sensing circuitry 102 that includes a digital logic circuitry 114, analog-to-digital converter (ADC) 108, excitation circuitry 104, and clock signal source 106. In the example shown in FIG. 1, excitation circuitry 104 is configured to generate four excitation currents ($I_{EX1}$ to $I_{EX4}$, represented as excitation current $I_{EX}$ in FIG. 1) where at least some of the excitation currents are related to a standard current according to one or more predetermined fractional mirror ratios. Analog-to-digital converter (ADC) 108 is operatively coupled to emitter sense line (DXP) 110 and base sense line (DXN) 112, and is configured to measure a voltage drop across DXP 110 and DXN 112 to determine $V_{BE}$, for example, by way of a differential input. In one or more embodiments, ADC 108 may be a sigma-delta ADC, though the disclosure is not so limited and one of ordinary skill in the art would recognize that other ADCs could be used as a front-end to digital logic circuitry 114, including, for example, a direct conversion ADC, a delta-encoded ADC, a successive-approximation-register (SAR) ADC, a pipeline ADC, a time-interleaved ADC, an integrating ADC, a Wilkinson ADC, and a ramp-compare ADC. ADC 108 is clocked from clock signal source 106.

An output of ADC 108 is operably coupled to digital logic circuitry 114. Digital logic circuitry 114 may be configured to receive digital signals indicative of measured voltages (which also includes both measured voltages and measurable voltages) from ADC 108. In one or more embodiments, digital logic circuitry 114 is configured to determine $V_{BE}$ responsive to the received signals indicative of measured voltages and determine changes to $V_{BE}$ (i.e., $\Delta V_{BE}$) associated with such determined $V_{BE}$s. Each voltage measurement and therefore value of $V_{BE}$ may be associated with an excitation current of the excitation currents (e.g., one of $I_{EX1}$-$I_{EX4}$), including those excitation currents that are related to a standard current according to a fractional mirror ratio. In one or more embodiments, digital logic circuitry 114 may include a math engine 118 configured to calculate temperature values associated with remote temperature diode 120 using Equation 3.1, $\Delta V_{BE}$'s, excitation current values, and known natural logarithms (i.e., known integer results of natural logarithms).

Notably, forward biasing techniques of this disclosure may not necessarily generate error free temperature measurements, and may introduce some temperature error, for example, due to a mismatch between actual fractional mirror ratios of excitation currents and predetermined fractional mirror ratios. Generally, mirror mismatch of about 1% to about 0.1% results in a temperature error of 0.37° Celsius to 0.037° Celsius. By way of example, in one or more embodiments, an about 0.1% mirror mismatch may be realized by using an analog layout of excitation circuitry 104.

In one or more embodiments, the digital values received by math engine 118 may be post-processed. In other words, output of ADC 108 may be processed (e.g., by decimation filter 116) to, for example, correct for errors (e.g., mismatch errors) or filter noise, and a post-processed value may be used by math engine 118 to calculate temperatures.

FIG. 2 shows a flowchart for an example temperature calculation process 200 that uses predetermined fractional currents, in accordance with one or more embodiments of the disclosure. In operation 202, a number of voltage measurements are received. Each voltage measurement of the number of voltage measurements may be associated with an excitation current of a number of excitation currents. In one embodiment, at least some voltage measurements are fractional voltages. In another embodiment, all voltage measurements are fractional voltages. In operation 204, a least two voltage changes are determined responsive to the voltage measurements of operation 202. In operation 206, a temperature is determined responsive to at least two voltage changes and excitation currents. In one embodiment, at least some of the excitation currents are fractional currents. In one or more embodiments, fractional currents may be characterized by a relationship with a standard current, where the relationship is a fractional ratio.

Figure 3:
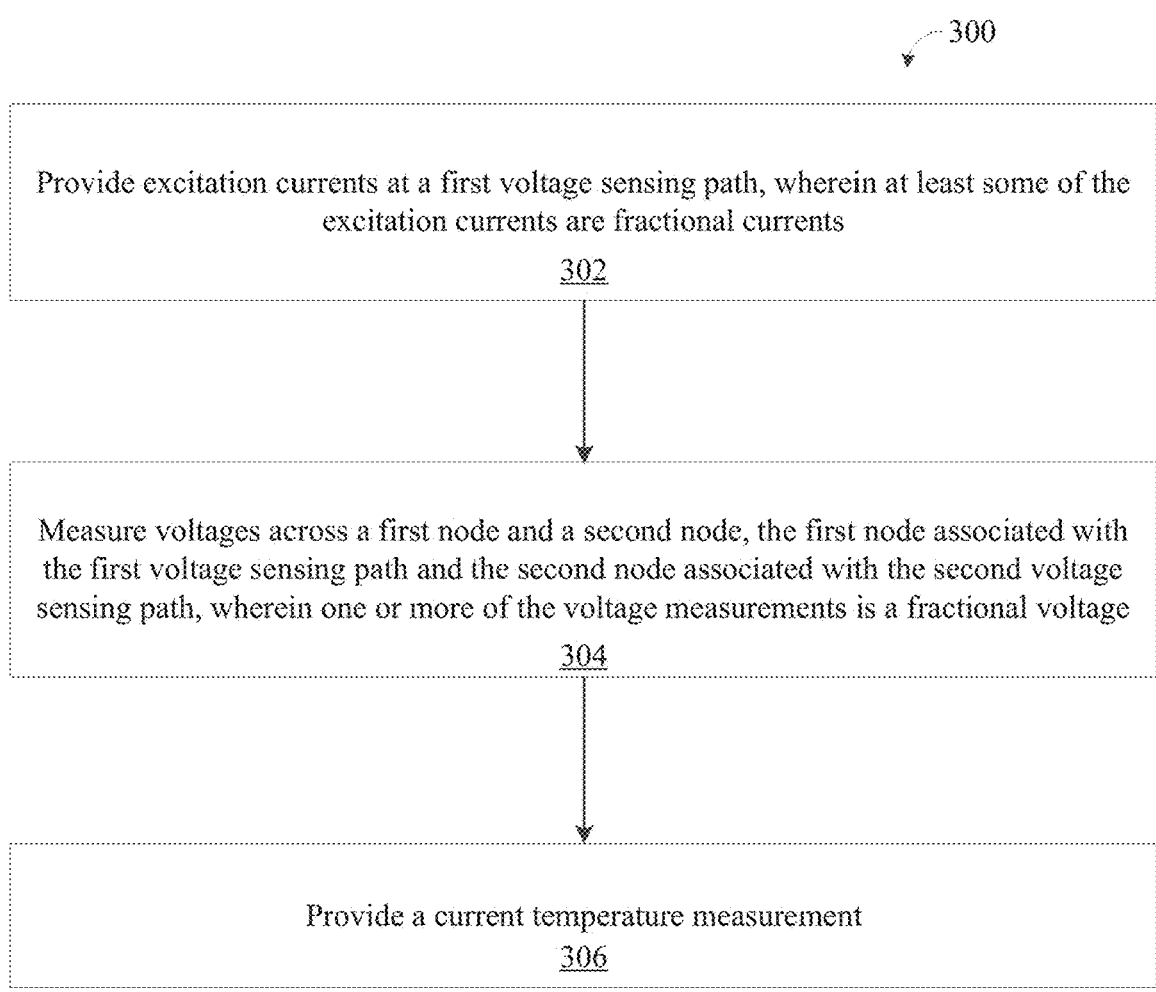
FIG. 3 shows a temperature sensing process that uses fractional mirror currents to forward bias a remote temperature sensor, in accordance with one or more embodiments of the disclosure.

FIG. 3 shows a flowchart for an example temperature sensing process 300 that uses fractional mirror currents to forward bias a remote temperature sensor, in accordance with one or more embodiments of the disclosure. In operation 302, excitation currents are provided at a first voltage sensing path. In one embodiment the excitation currents are biasing currents. In one embodiment, at least some of the excitation currents are fractional currents. In one embodiment, at least some of the excitation currents are related to a standard current according to one or more fractional mirror ratios. In operation 304, voltages are measured across a first node and a second node responsive to each of the excitation currents of operation 302. The first node may be associated with the first voltage sensing path and the second node may be associated with a second voltage sensing path. In one embodiment, one or more of the voltage measurements is a fractional voltage. In operation 306, a temperature measurement is provided. In one embodiment, the temperature measurement may be provided responsive to one or more fractional voltage measurements (e.g., made in operation 304).

Figure 4:
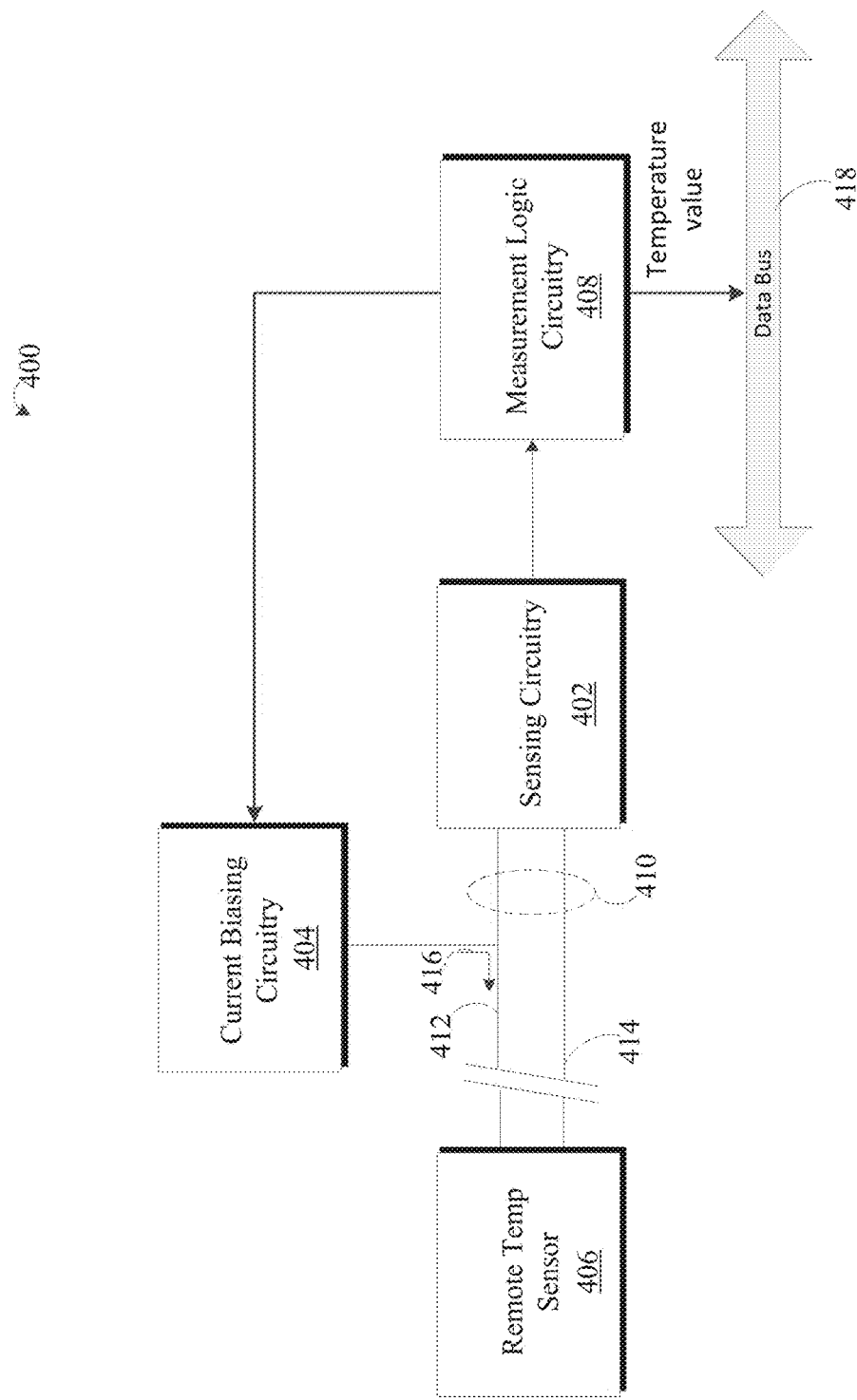
FIG. 4 shows an embodiment of a remote temperature sensor system that is configured to implement base-resistance cancellation techniques, in accordance with one or more embodiments.

FIG. 4 shows a functional block diagram of an example embodiment of a remote temperature sensor system 400 configured to implement base-resistance cancellation techniques, in accordance with one or more embodiments. In one or more embodiments, remote temperature sensor system 400 may include remote sensor 406 (also referred to herein as "remote sensor 406"), sensing circuitry 402, measurement logic circuitry 408, and current biasing circuitry 404. In one embodiment, remote sensor 406 may be a bipolar junction transistor (BJT), but, in another embodiment, it may be a diode. Remote sensor 406 may be operatively coupled to sensing paths 410 of sensing circuitry 402, which may be configured to measure voltage drops across the two sensing paths 410. First sensing path 412 may be operatively coupled to current biasing circuitry 404, which may be configured to provide one or more biasing currents 416 to first sensing path 412, at least some of one or more biasing currents 416 may be related to a standard current according to a fractional mirror ratio. Sensing circuitry 402 may be configured to measure voltage drops across sensing paths 410 caused by biasing currents provided by current biasing circuitry 404. Sensing circuitry 402 may be configured to measure such voltage drops by any means known to one of ordinary skill in the art, including, for example, using an ADC to provide digital signal indicative of voltage drops.

Sensing circuitry 402 may be configured to output digital signals that are indicative of voltage drops across the sensing paths 410, respectively depicted by FIG. 4 as sensing path 412 and sensing path 414, and measurement logic circuitry 408 may be configured to determine a temperature responsive to such voltage drops, biasing currents, and known natural logarithms. In one or more embodiments, measurement logic circuitry 408 may be a post-processing algorithm unit or a state machine (e.g., adders, flip flops, and/or multiplexers implementing a digital logic circuit equivalent to the calculations described herein). In one or more embodiments, measurement logic circuitry 408 may be a host processor on a microcontroller. In one or more embodiments, remote temperature sensor system 400 may be operatively coupled to a data bus 418, and a determined temperature may be provide as a digital signal at the data bus 418. In one embodiment, data bus 418 may be a peripheral data bus, for example, a UART, USART, or $I^2C$ bus.

Any characterization in this disclosure of something as "typical," "conventional," or "known" does not necessarily mean that it is disclosed in the prior art or that the discussed aspects are appreciated in the prior art. Nor does it necessarily mean that, in the relevant field, it is widely known, well-understood, or routinely used.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A method, the method comprising:
   providing excitation currents to at least one sensing path of two sensing paths to bias a remote diode temperature sensor, wherein at least some excitation currents are fractional currents;
   measuring voltages across the two sensing paths while the excitation currents are provided to the at least one sensing path;
   determining at least two voltage changes responsive to, at least in part, the voltage measurements; and
   determining a temperature responsive to, at least in part, the at least two voltage changes and a value of a fractional mirror ratio representing a relationship between the at least some excitation currents that are fractional currents.

2. The method of claim 1, wherein measuring voltages across the two sensing paths while the excitation currents are provided to the at least one sensing path comprises:
   measuring a first and a second voltage responsive to a first pair of excitation currents; and
   measuring a second and a third voltage responsive to a second pair of excitation currents.

3. The method of claim 1, wherein measuring voltages across the two sensing paths while the excitation currents are provided to the at least one sensing path comprises measuring at least some fractional voltages.

4. The method of claim 1, wherein determining the temperature responsive to, at least in part, the at least two voltage changes and the fractional mirror ratio comprises using digital logic circuitry to solve a temperature equation that includes natural logarithms as parameters.

5. The method of claim 1, wherein providing the excitation currents to the at least one sensing path comprises providing two or more pairs of excitation currents to the at least one sensing path.

6. The method of claim 5, wherein providing two or more pairs of excitation currents to that at least one sensing path comprises:

providing a first excitation current to the at least one sensing path; and providing a second excitation current to the at least one sensing path, wherein the second excitation current is related to the first excitation current according to the fractional mirror ratio.

7. The method of claim 6, wherein the fractional mirror ratio is characterized in that a natural logarithm of the fractional mirror ratio or an integer-multiple of the fractional mirror ratio is a non-fractional integer number.

8. An apparatus, comprising:
an excitation circuitry to emit one or more excitation currents to bias a remote diode temperature sensor, wherein at least some excitation currents are fractional currents;
a sensing circuitry to measure voltages across a pair of nodes located at sensing paths coupled to the remote diode temperature sensor responsive to the one or more excitation currents;
a measurement logic circuitry to:
determine changes in voltage across the pair of nodes responsive to the measured voltages; and
determine a temperature responsive to, at least in part, values representing at least two voltage changes across the pair nodes and a value of a fractional mirror ratio representing a relationship between the at least some excitation currents that are fractional currents.

9. The apparatus of claim 8, wherein the excitation circuitry is as a current mirror configuration.

10. The apparatus of claim 8, wherein the sensing circuitry is to measure voltages across the pair of nodes responsive to the excitation currents by:
measuring a first and second voltage responsive to a first pair of excitation currents; and
measuring a second and third voltage responsive to a second pair of excitation currents.

11. The apparatus of claim 8, wherein the sensing circuitry is to measure voltages across the pair of nodes responsive to the excitation currents by measuring at least some fractional voltages.

12. The apparatus of claim 8, wherein the measurement logic circuitry is to determine the temperature, at least in part, by solving a temperature equation that includes natural logarithms as parameters.

13. The apparatus of claim 8, wherein the excitation circuitry is to emit two or more pairs of excitation currents.

14. The apparatus of claim 13, wherein the excitation circuitry is to provide two or more pairs of excitation currents by:
providing a first excitation current to the at least one sensing path; and
providing a second excitation current to the at least one sensing path, wherein the second excitation current is related to the first excitation current according to the fractional mirror ratio.

15. The apparatus of claim 14, wherein the fractional mirror ratio is characterized in that a natural logarithm of the fractional mirror ratio or an integer-multiple of the fractional mirror ratio is a non-fractional integer number.

16. A system, comprising:
a remote temperature sensor to generate detectable responses to temperature changes; and
a temperature sensing system including at least two nodes for operable coupling to the remote temperature sensor, the temperature sensing system to:
provide excitation currents to bias the remote temperature sensor;
receive at least two voltage changes across the two nodes; and
output one or more temperatures at least partially responsive to the at least two voltage changes and a value of a fractional mirror ratio representing a relationship between fractional voltages generated responsive to the excitation currents.

17. The system of claim 16, wherein the temperature sensing system is to communicate the one or more temperatures on a data bus.

18. The system of claim 16, wherein the at least two voltage changes includes voltage changes of fractional voltages.

19. The system of claim 16, wherein temperature sensing system comprises an excitation circuit, a clock signal source, digital logic circuitry, and a front-end to the digital logic circuitry.

20. The system of claim 19, wherein the digital logic circuitry comprises a math engine.

\* \* \* \* \*